United States Patent [19]

Ohwada

[11] 4,443,849

[45] Apr. 17, 1984

[54] ERROR RECOVERY SYSTEM OF A MULTI-PROCESSOR SYSTEM FOR RECOVERING AN ERROR BY TRANSFERRING STATUS SINGALS FROM ONE PROCESSOR TO ANOTHER WITHOUT USE OF A MAIN MEMORY

[75] Inventor: Hiroyuki Ohwada, Tokyo, Japan

[73] Assignee: Nippon Electric Co., Ltd., Tokyo, Japan

[21] Appl. No.: 309,132

[22] Filed: Oct. 6, 1981

[30] Foreign Application Priority Data

Oct. 9, 1980 [JP] Japan .............................. 55-141323

[51] Int. Cl.³ .......................................... G06F 11/00
[52] U.S. Cl. ...................................... 364/200; 371/9; 371/12; 371/16
[58] Field of Search ................ 371/9, 12, 16; 364/200

[56] References Cited

U.S. PATENT DOCUMENTS

| | | | |
|---|---|---|---|
| 3,838,261 | 9/1974 | Rice et al. ................................ 371/9 |
| 4,099,234 | 7/1978 | Words et al. ....................... 364/200 |
| 4,099,241 | 7/1978 | Ossteldt ............................... 364/200 |
| 4,156,278 | 5/1979 | Wilhite ................................ 364/200 |
| 4,270,168 | 5/1981 | Murphy et al. ..................... 364/200 |
| 4,371,754 | 2/1983 | De et al. .................................. 371/9 |

*Primary Examiner*—Charles E. Atkinson
*Attorney, Agent, or Firm*—Sughrue, Mion, Zinn, Macpeak and Seas

[57] ABSTRACT

For an error recovery system, one of processors (21) produces an error signal upon occurrence of an error to suspend execution of a particular instruction and to keep retry enable and status signals related to the particular instruction. In the system, a diagnostic unit (30) comprises a storage circuit (76) responsive to the retry enable signal for taking over the status signals directly from the frist processor rather than via a common main memory (20). On occurrence of the error, another of the processors (22) produces a ready signal after completion of execution of an instruction being executed. Responsive to the retry enable and ready signals, the diagnostic unit transfers the status signals to another processor from the storage circuit directly rather than via the main memory to make another processor execute the particular instruction. The error signal may be sent to the diagnostic unit and/or the second processor.

6 Claims, 16 Drawing Figures

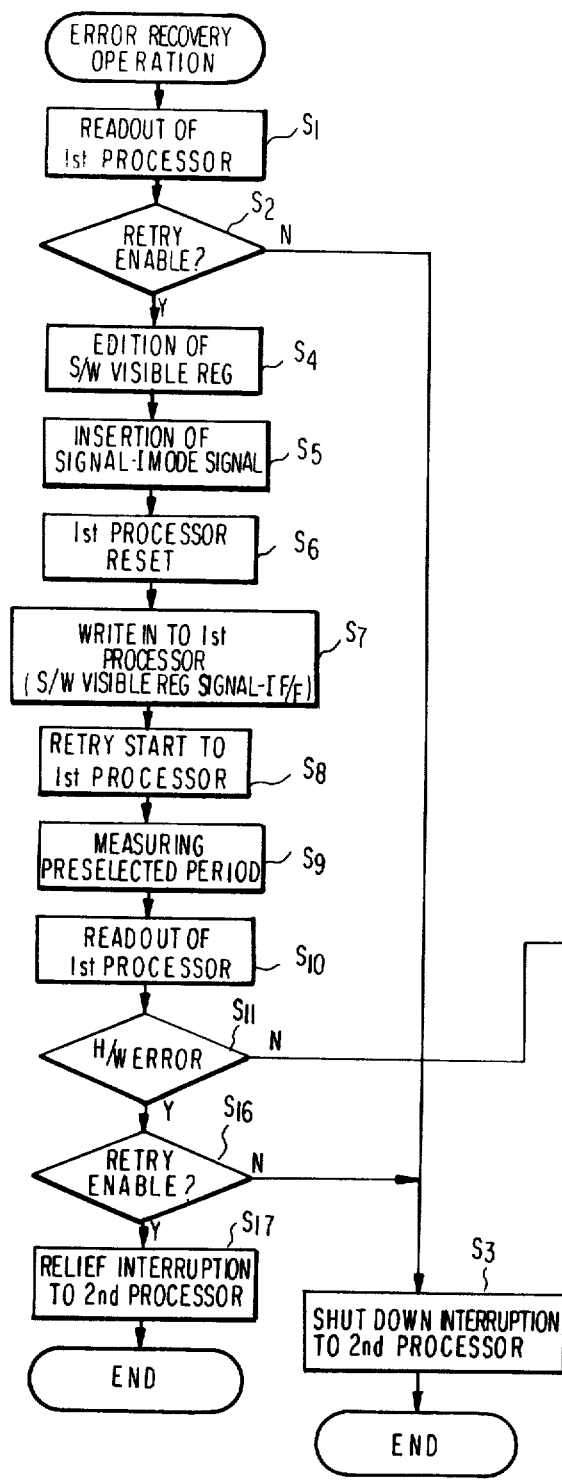
FIG. 7
FIG. 8

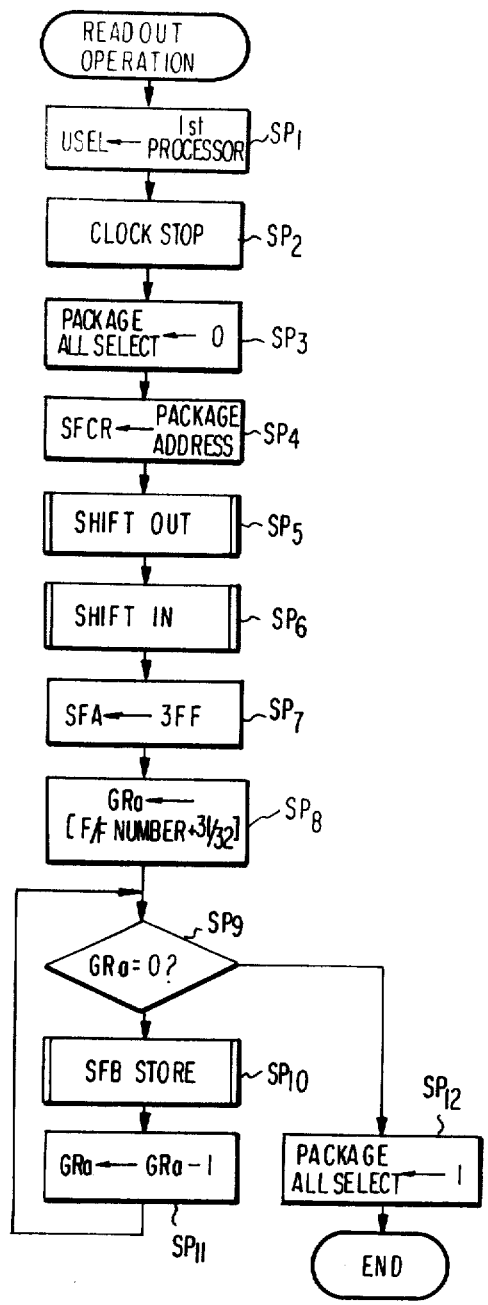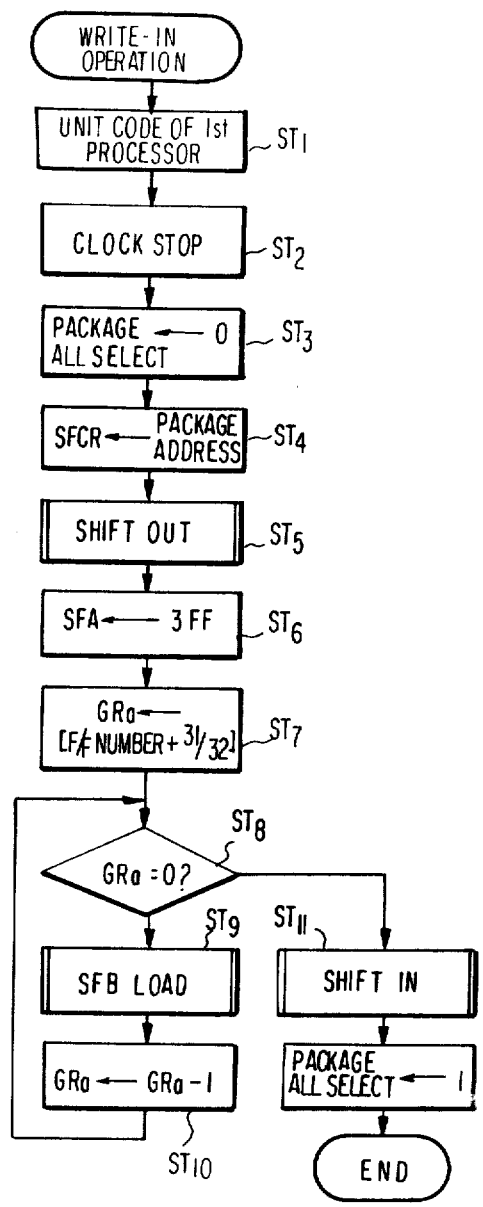

ERROR RECOVERY SYSTEM OF A MULTI-PROCESSOR SYSTEM FOR RECOVERING AN ERROR BY TRANSFERRING STATUS SINGALS FROM ONE PROCESSOR TO ANOTHER WITHOUT USE OF A MAIN MEMORY

BACKGROUND OF THE INVENTION

This invention relates to an error recovery system for use in an electronic digital computer system comprising a plurality of processors.

In a conventional electronic computer system disclosed in U.S. Pat. No. 3,248,697 issued to Howard C. Montgomery, assigned to International Business Machines Corporation, use is made of a plurality of processors each of which allows each instruction to be retried therein in order to recover an error in one of the processors. This system is effective to remove transient errors but is invalid against occurrence of long-lived or physical errors.

In another conventional electronic computer system disclosed by J. A. Arulpragasam in British Patent Specification No. 1,163,859, a pair of error recovery units are coupled to a pair of processors and a main memory. On occurrence of an error in one of the processors, this system transfers, from the one processor to the main memory through one of the error recovery units, those status data which appear in the one processor. Thereafter, the other processor takes over operation of the one processor by accessing the status data stored in the main memory. It is possible for this system to recover long-lived errors also in each processor by taking over operation of each processor by the other processor.

With this system, the status data should inevitably be accompanied by control signals peculiar to the status data when the status data are sent from one processor into the main memory. Otherwise, the other processor cannot carry out the recovery operation. This is because no stored status data are taken over by the other processor without the control signals. However, the control signals cannot always be produced by each processor.

More particularly, each processor processes a plurality of programs some of which relate to tasks carried out in each processor and the others of which relate to a kernel or nucleus of the computer system. In the latter programs, a dispatcher program and an interruption handler make no interruption take place unless the system itself is broken down. This means that no control signals can be produced in each processor on occurrence of an error insofar as the dispatcher program and the interruption handler are concerned. Accordingly, the error cannot be recovered with the conventional computer system when it takes place during execution of the dispatcher program or the interruption handler.

SUMMARY OF THE INVENTION

It is an object of this invention to provide a recovering system which is capable of recovering an error even during execution of a dispatcher program or an interruption handler without production of any control signals.

An error recovery system to which this invention is applicable is for use in combination with an electronic digital computer system comprising a main memory for storing a plurality of programs and a plurality of processors for processing the programs. Each program comprises a succession of instructions. Each processor comprises executing means for fetching selected ones of the instructions and for executing the selected instructions to produce masses of information, monitoring means for monitoring operation of the executing means to produce an error signal when an error is detected during execution of a particular one of the selected instructions and to suspend execution of the particular instruction, and retry enable signal producing means for producing a retry enable signal during a period that retry of execution of each of the selected instructions is allowable. The executing means includes register means responsive to the error signal for keeping, as status signals, a mass of information resulting from execution of the particular instruction. The error recovery system is energized on occurrence of the error in a first of the processors to make a second of the processors take over execution of the particular instruction. According to this invention, an error recovery system comprises storage means coupled to the retry enable signal producing means and the register means of the first processor and responsive to the retry enable signal produced in the first processor for taking over for storage therein the status signals kept in the first processor directly therefrom without being sent through the main memory. The second processor comprises suspending means energized upon occurrence of the error in the first processor for suspending operation of the executing means of the second processor after completion of execution of one of the instructions fetched by the second processor that is currently executed and ready signal producing means coupled to the suspending means for producing a ready signal after completion of execution of the one of the instructions. The error recovery system further comprises delivering means responsive to the retry enable signal produced in the first processor and the ready signal for delivering the status signals directly from the storage means to the register means of the second processor without passing through the main memory, thereby, to enable the second processor to take over execution of the particular instruction.

BRIEF DESCRIPTION OF THE DRAWING

FIG. 7 is a flow chart of a part of error recovery operation carried out by the error recovery system according to the embodiment of this invention;

FIG. 8 is a flow chart of another part of the error recovery operation illustrated in FIG. 7;

FIG. 10 is a flow chart of readout operation carried out in the diagnostic unit portion illustrated in FIG. 9;

FIG. 14 is a flow chart of write-in operation carried out in the diagnostic unit portion illustrated in FIG. 9;

DESCRIPTION OF THE PREFERRED EMBODIMENTS

Figure 1:
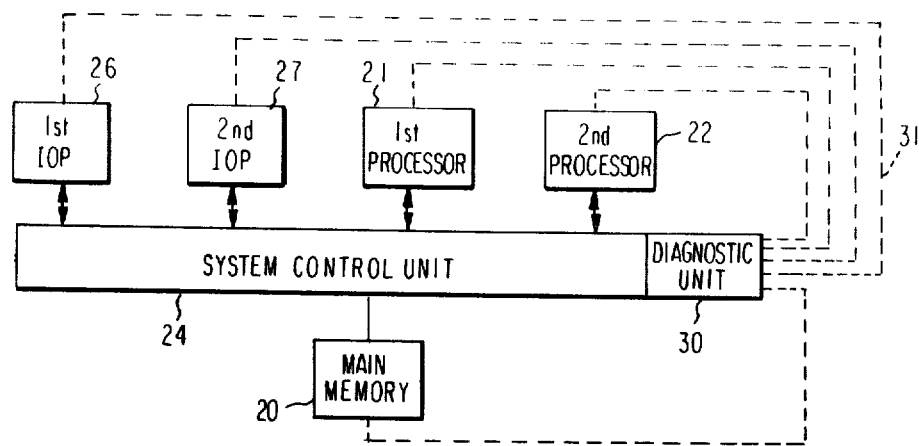
FIG. 1 schematically shows a block diagram of an electronic digital computer system to which this invention is applicable.

Referring to FIG. 1, an electronic digital computer system to which this invention is applicable comprises a main memory 20 for storing a plurality of programs each of which comprises a succession or a group of instructions. Some of the programs are for controlling the system as a whole while the other of them are for specifying user jobs each of which is divisible into a sequence of tasks. In the former, a dispatcher program is included to decide the next following operation and is for specifying a kernel or nucleus of the computer system. A conventional computer system is invalid against an error appearing during execution of the dispatcher program, as described in the preamble of the instant specification.

In FIG. 1, the computer system comprises a plurality of processors for processing the programs. By way of example, first and second processors 21 and 22 are depicted in this figure. At least one additional processor may be incorporated in this computer system. Each of the first and the second processors 21 and 22 is coupled to the main memory 20 through a system control unit 24 for controlling the whole computer system.

The illustrated computer system further comprises a pair of input/output processors (abbreviated to IOP hereinafter) 26 and 27 coupled to peripheral devices (not shown), such as a magnetic disk unit, a magnetic tape unit, a card reader, a line printer, and the like. The IOP's 26 and 27 are also coupled to the main memory 20 through the system control unit 24. Each of the IOP's 26 and 27 serves to execute channel programs issued from the first or the second processor 21 or 22 and to transfer results of execution of the channel programs from the peripheral devices to the main memory 20.

Responsive to commands issued from the first and the second processors 21 and 22 and from the IOP's 26 and 27, the system control unit 24 delivers the commands to the main memory 20 in accordance with a predetermined order of priority.

A diagnostic unit 30 is incorporated with the system control unit 24 and is coupled to the main memory 20, the first and the second processors 21 and 22, and the IOP's 26 and 27 through diagnostic interfaces 31 illustrated by broken lines. The diagnostic interfaces 31 are energized on maintaining and diagnosing the computer system. The diagnostic unit 30 serves as an error recovery system in cooperation with the diagnostic interfaces 31 as will become clear as the description proceeds. Briefly, the illustrated diagnostic unit 30 is for recovering an error in either one of the first and the second processors 21 and 22, although coupled to the IOP's 26 and 27 also. Therefore, the IOP's 26 and 27 will be left out of consideration hereinafter.

Figure 2:
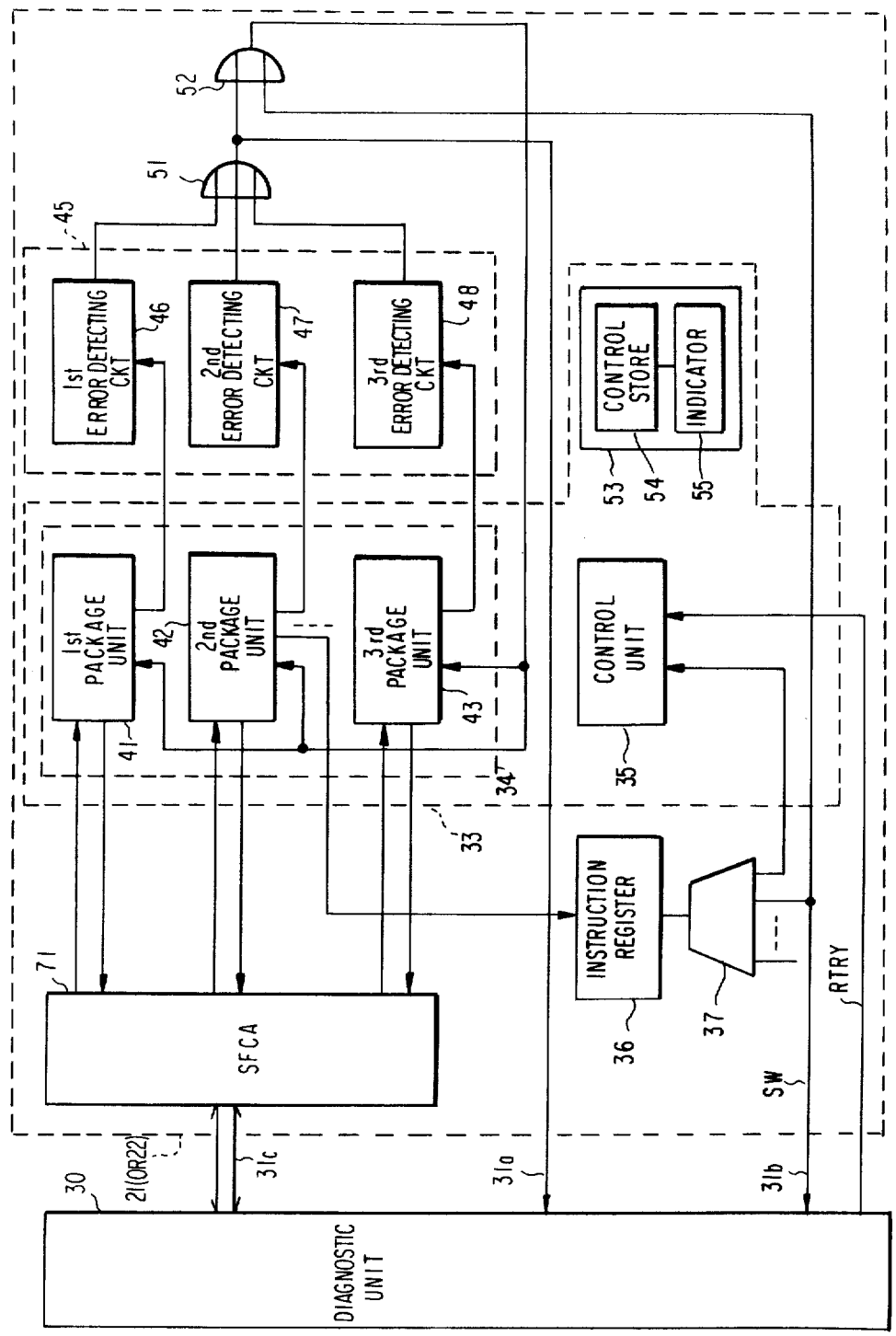
FIG. 2 is a block diagram of each processor which is used in the computer system illustrated in FIG. 1 and is capable of being coupled to an error recovery system according to an embodiment of this invention.

Referring to FIG. 1 again and FIG. 2 anew, each of the first and the econd processors 21 and 22 (typified by a single processor 21 or 22 in FIG. 2) comprises an executing section 33 comprising, in turn, a logic circuit unit 34 and a control unit 35 for fetching selected ones of the instructions from the main memory 20 to control the logic circuit unit 34. The selected instructions are supplied to the control unit 35 through the logic circuit unit 34, an instruction register 36, and a decoder 37. The logic circuit unit 34 is for executing the selected instructions to produce masses of information. More particularly, the illustrated logic circuit unit 34 comprises scores of package units each of which is an aggregate of logic elements as will be described later. A first one 41 of the package units is operable as an execution unit for actually executing the selected instructions while a second one 42, as a cache control unit for controlling a cache memory (not shown). Each of the selected instructions is delivered through the second package unit 42 to the instruction register 36. A third one 43 of the package units is put into operation as an address production unit for producing an address signal.

In a normal mode in which no error is present in each of the first and the second processors 21 and 22, the first, the second, and the third package units 41 through 43 are operated as an execution unit, a cache unit, and an address preparation unit, respectively, all of which are described by John E. Wilhite with reference to FIG. 2 in U.S. Pat. No. 4,156,278. Operation of the first through third package units 41 through 43 in the normal mode will therefore not be described any further.

The package units, especially, the first package unit 41, include a plurality of program or software visible registers comprising an accumulator, an index register, an instruction counter, and a quotient register, all of which are described in the above-referenced Wilhite U.S. patent. Therefore, operation of these registers will not be described in the instant specification in detail. It may be understood that the software visible registers are operable by the use of software.

In FIG. 2, operation of the logic circuit unit 34 is monitored by an error detecting unit 45 as a whole. More particularly, the first, the second, and the third package units 41, 42, and 43 are coupled to first, second, and third error detecting circuits 46, 47, and 48, respectively, to watch or monitor operation of each package unit. Each of the first through third error detecting circuits 46 through 48 carries out a parity check or the like in a well-known manner and produces an error signal ER through a first OR gate 51 when an error is detected in each package unit during execution of a particular one of the selected instructions. The error signal ER of each package unit is delivered to all of the package units 41 through 43 from the first OR gate 51 through a second OR gate 52. Responsive to the error signal ER, every package unit suspends execution of the particular instruction as will later be described. Thus, all of the error detection circuits 46, 47, and 48 are operable in cooperation with the first OR gate 51 to detect an error in the executing section 34.

The first OR gate 51 is connected to a first one of the diagnostic interfaces indicated at 31a. Therefore, the error signal ER is sent to the diagnostic unit 30 from the first OR gate 51 through the first diagnostic interface 31a. The second OR gate 52 is connected to the decoder 37. When a predetermined one of the selected instructions, which will be called a swap and start instruction (abbreviated to SAS instruction hereinafter), is fetched from the main memory 20 to be kept in the instruction register 36, the decoder 37 delivers a swap signal SW to the diagnostic unit 30 through a second one of the diagnostic interfaces depicted at 31b and to the second OR gate 52. All of the package units 41, 42, 43 are also suspended in response to the swap signal SW supplied through the second OR gate 52.

Further referring to FIG. 2, each of the processors 21 and 22 comprises a control store unit 53 comprising a control storage 54 for storing a sequence of microinstructions to process every one of the selected instructions. This means that each of the selected instructions is processed stepwise in accordance with the microinstructions through several stages, namely, fetch, interpretting, executing, and storing stages.

In the meantime, it may happen that an error takes place in each processor at any stage during processing of the particular instruction. It is known in the art that the error can be recovered unless it takes place during the storing stage or the last stage. This is because the software visible registers in each processor are not cleared before the storing stage and retry of the particular instruction is possible by the use of status signals remaining in the software visible registers.

In FIG. 2, the control store unit 53 comprises an indicator 55 coupled to the control storage 54 to indicate whether or not retry of each of the selected instructions is possible in the processor 21 or 22. The indicator 55 is formed by a flip flop and reset at the fetch or first stage of each selected instruction. In the reset state, the indicator 55 produces a retry enable signal representative of a state in which retry is possible. On the other hand, the indicator 55 is set at the last or storing stage of each instruction to make the retry enable signal disappear. At this time, all of the software visible registers are cleared to process the next following selected instruction. Thus, the retry enable signal lasts during a period that retry of execution of each selected instruction is allowable. From this fact, it is readily understood that the control store unit 53 serves to produce the retry enable signal.

Such control of the indicator 55 is possible by defining a retry threshold control bit in a preselected microinstruction stored in the control storage 54. In the aforementioned Wilhite U.S. patent, use is possible of the 47th bit of a micro-instruction illustrated in FIG. 6b, as the retry threshold control bit.

Figure 3:
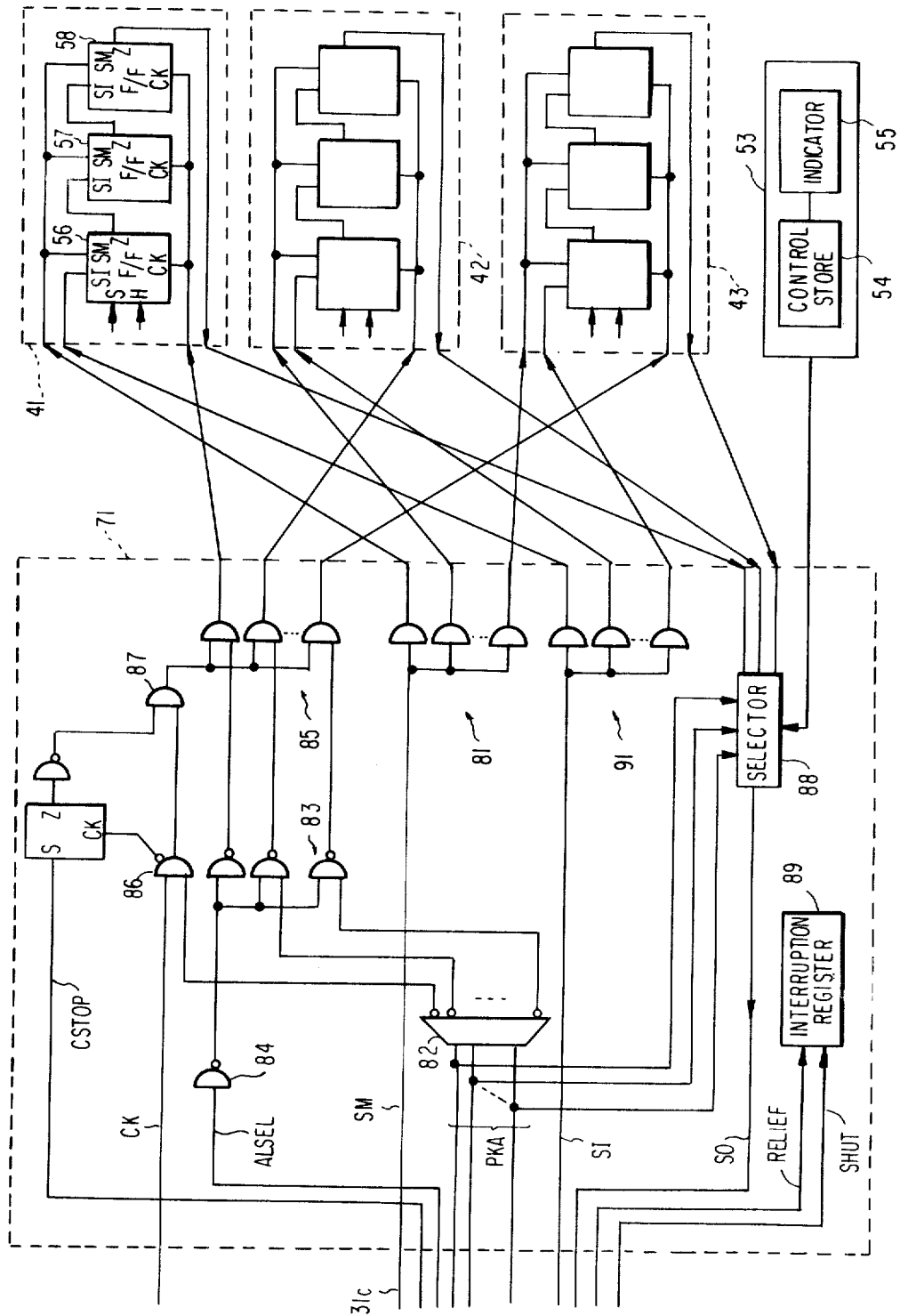
FIG. 3 is a detailed block diagram of a portion of the processor illustrated in FIG. 2.

Referring to FIG. 3 together with FIG. 2, each of the first through the third package units 41 through 43 comprises, as the logic elements, a plurality of flip flop elements 56, 57, and 58 operable as a part of each register in the normal mode. Besides sequential circuit elements, such as the flip flops 56 through 58, a great number of combinational circuit elements, such as gate circuits, are included in each package unit but they are omitted from FIG. 3 to avoid complication of illustration.

In an error mode in which an error takes place in one of package units, each of the flip flop elements 56, 57, and 58 keeps the latest state therein as a status signal and is operated in each package unit as a single shift register to shift a data string in cooperation with the diagnostic unit 30 as will become clear as the description proceeds.

For provision of operation in the normal and the error modes, each of the flip flop elements 56, 57, and 58 has a set terminal S for an input signal supplied from the other part of each package unit during the normal mode, a hold terminal H connected to the second OR gate 52 to keep or freeze the latest state of each element on production of the error and the swap signals ER and SW, and a clock terminal CK supplied with a sequence of clock pulses (depicted by a similar reference symbol CK). Furthermore, each flip flop element, such as 56, has a shift mode terminal SM for a shift mode pulse SM (represented by a similar symbol SM) supplied from the diagnostic unit 30, a shift-in terminal SI for a shift-in data string (represented by a like symbol SI) supplied from the diagnostic unit 30, and an output terminal Z for supplying an output signal to the other circuit portion of each package unit (not shown) in the normal mode and for shifting out the output signal to the diagnostic unit 30. The indicator 55 is also similar in structure to each flip flop element 56, 57, and 58. Therefore, the indicator 55 may be considered as one of the registers. Thus, the executing section 33 includes the registers responsive to the error signal ER for keeping, as status signals, a mass of information resulting from execution of the particular instruction.

Figure 4:
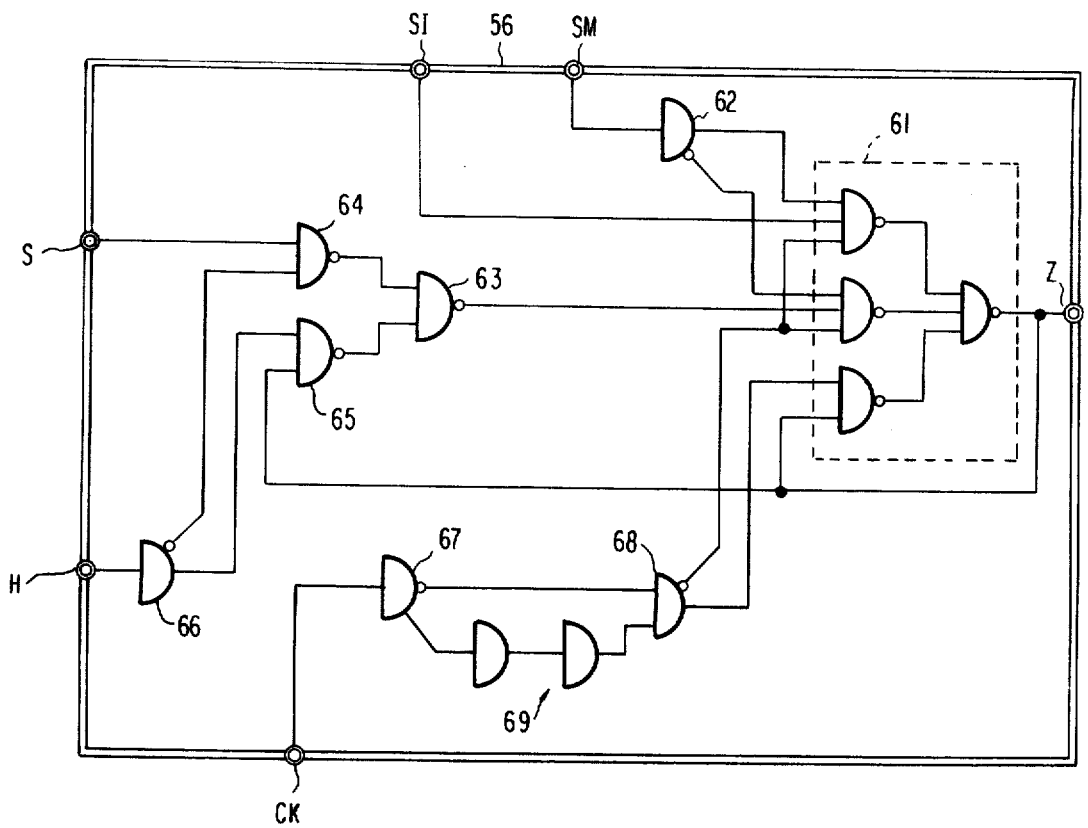
FIG. 4 is a block diagram of a flip flop shown in the processor portion of FIG. 3.

Temporarily referring to FIG. 4, the flip flop element (typified by the flip flop element 56) comprises a flip flop cell 61 connected to the output terminal Z and formed by four NAND gates. On the shift mode terminal SM coupled to the flip flop cell 61 through an AND/NAND gate 62, a logic "0" level appears in the normal mode while a logic "1" level appears as the shift mode pulse SM in the error mode. On the hold terminal H, the logic "1" level appears on production of the error signal ER or the swap signal SW. The set and the hold terminals S and H are coupled to the flip flop cell 61 through four gates 63, 64, 65, and 66 while the shift-in terminal SI is directly coupled to the flip flop cell 61. In addition, two of AND/NAND gates 67 and 68 and an AND gate pair 69 are connected between the clock terminal CK and the flip flop cell 61. A combination of these gates 67, 68, and 69 is for differentiating each of the clock pulses at the leading edge thereof.

When the logic "0" level is given to both of the shift mode terminal SM and the hold terminal H, the gates 63, 64, and 65 selectively connect the set terminal S to the flip flop cell 61. In other words, the input signal is sent from the set terminal S to the cell 61 in the normal mode. When the logic "1" level appears on the hold terminal H, the cell 61 keeps the latest state even when the shift mode terminal SM is given the logic "0" level. When the logic "1" level appears on the shift mode terminal SM, the shift-in data string is fed into the flip flop cell 61 through the shift-in terminal SI.

Turning back to FIGS. 2 and 3, each of the processors 21 and 22 comprises a shift control interface adapter 71 used to connect each of the package units 41 through 43 to third ones of the diagnostic interfaces, indicated at 31c, when the error takes place in each processor 21 or 22. As best shown in FIG. 3, every flip flop element 56, 57, and 58 in the first package unit 41 is connected to the shift control interface adapter 71 at the shift mode terminal SM and the clock terminal CK. The shift-in terminal SI of the first stage flip flop element 56 and the output terminal Z of the last stage flip flop element 58 are also connected to the shift control interface adapter 71. The remaining output terminals Z are connected to the shift-in terminals SI of the next following flip flop elements. Thus, the flip flop elements 56, 57, and 58 are operable as a single shift register during presence of the shift mode pulse SM. The flip flop elements of each of the remaining package units 42 and 43 are connected to the shift control interface adapter 71 in a similar manner.

The shift control interface adapter 71 serves to exchange the shift mode pulse SM, the shift-in data string SI, the shift-out data string SO, and any other signals between the respective package units 41 through 43 and the diagnostic unit 30 through the diagnostic interfaces 31a, 31b, and 31c, as will later be described more in detail.

Figure 5:
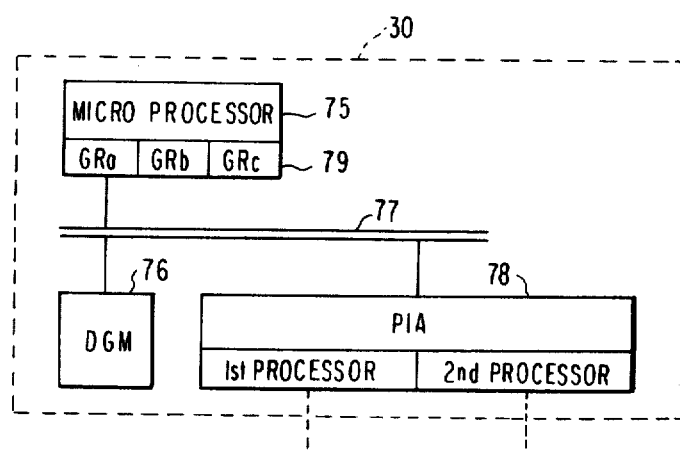
FIG. 5 is a block diagram of a diagnostic unit used in the error recovery system according to the embodiment.

Referring to FIG. 5, the diagnostic unit 30 is energized on occurrence of the error in one of the processors 21 and 22 and makes the other processor 22 take over execution of the particular instruction.

In FIG. 5, the diagnostic unit 30 comprises a microprocessor 75 (to be later described as regards its operation) and a diagnostic unit memory (abbreviated to DGM hereinafter) 76 for storing programs to be processed in the microprocessor 75 and the accompanying data. The DGM 76 is coupled through a common bus 77 to the microprocessor 75 and to a processor interface adapter (PIA) 78 operable as an input/output device for the microprocessor 75. The DGM 76 is loaded with the status signals and the retry enable signal from the first processor 21 on occurrence of the error therein to take over the status signals kept in the first processor 21 directly therefrom rather than sent through the main memory 20 as in the prior art. In fact, the status signals and the retry enable signal are sent as the shift-out data string SO from each package unit 41 through 43 to the shift control interface adapter 71, the diagnostic interface 31c, and the PIA 78 without the use of the main memory 20. The PIA 78 serves to drive the diagnostic interface 31 in a manner to be described later and to deliver the status signals. In addition, the microprocessor 75 comprises first, second, and third general registers (GR) 79a, 79b, and 79c coupled to the common bus 77.

Figure 6:
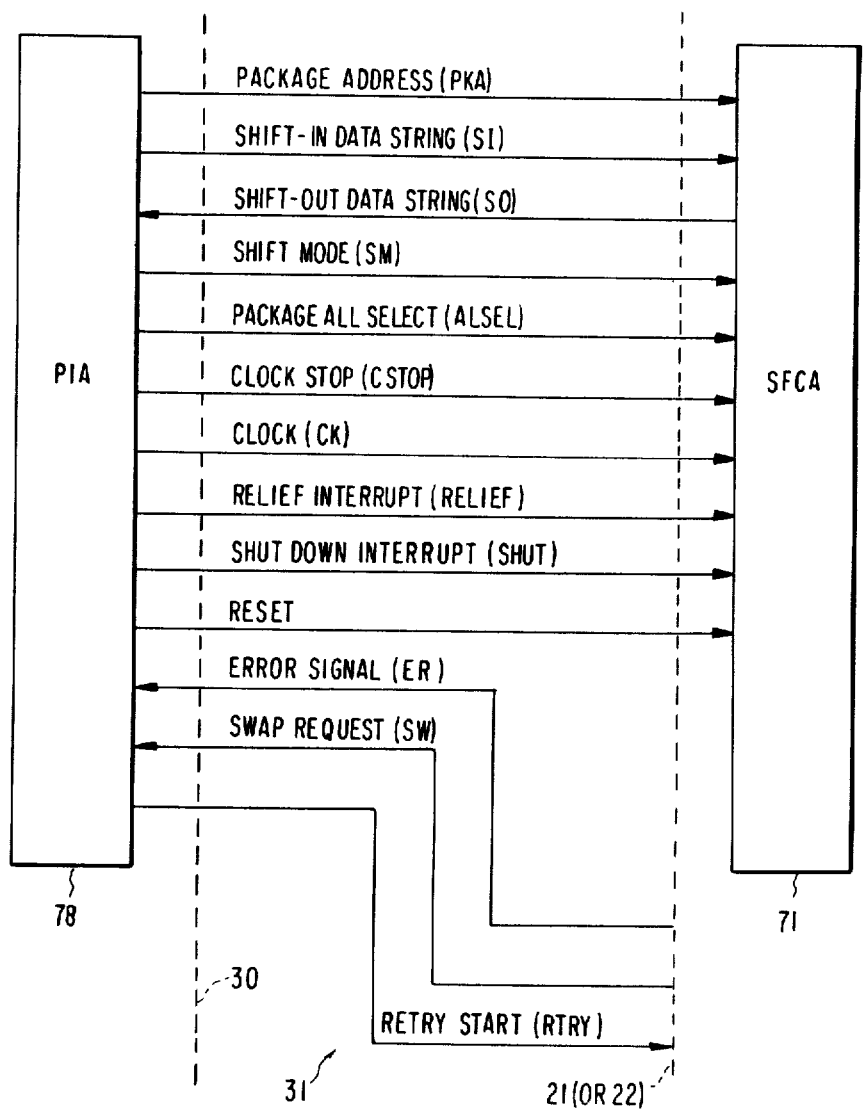
FIG. 6 is a block diagram of a diagnostic interface coupled to the diagnostic unit illustrated in FIG. 5.

Referring to FIGS. 6 and 7 together with FIGS. 2, 3, and 5, control operation of the diagnostic unit 30 will be described on the assumption that the error takes place in the first processor 21 during execution of a particular instruction.

In FIG. 2, when the error is detected in one of the detecting circuits 46 through 48 as a result of occurrence of the error in one of the package units 41 through 43, the error signal ER is produced by the one detecting circuit in question and is sent to every package unit to make each of the flip flops keep the latest status as the status signal. Moreover, the error signal ER is given from the first processor 21 to the diagnostic unit 30 through the diagnostic interface 31a.

Responsive to the error signal ER, the diagnositc unit 30 starts error recovery operation for the first processor 21. At first, the diagnostic unit 30 reads the status signals out of the respective flip flops of each package unit, as shown by a first stage S₁ in FIG. 7. Such operation will hereafter be named readout operation of registers.

For this purpose, the diagnostic unit 30 is in cooperation with the first processor 21 to simultaneously control the shift mode pulse SM, a package address signal PKA of eight bits, and an "all selection" pulse ALSEL of a single bit, all of which are illustrated in FIG. 6 and which are supplied to the SFCA 71 illustrated in FIG. 3. The package address signal PKA and the shift mode pulse SM are for specifying each of addresses preliminarily assigned to each of the package unit and the indicator 55 and for putting the respective registers of each package unit into a shift mode during presence of the shift mode pulse SM, respectively. The package address signal PKA and the shift mode signal SM are sent from the diagnostic unit 30 to the first processor 21 to access each of the package units in the first processor 21 after the error signal ER is supplied from the first processor 21 to the diagnostic unit 30. The all selection pulse ALSEL is for delivering the clock pulses CK to all of the package units during presence thereof. In other words, the all selection pulse ALSEL disappears on selective supply of the clock pulses CK to one of the package units.

Now, when the readout operation is carried out, the diagnostic unit 30 puts the shift mode pulse SM into the logic "1" level and the all selection pulse ALSEL into the logic "0" level, together with production of the package address signal PKA. In addition, a clock stop signal CSTOP is also produced by the diagnostic unit 30 to stop supply of the clock pulses CK to the first processor 21.

Under these circumstances, the SFCA 71 (FIG. 3) of the first processor 71 is operated on the readout operation in the following manner. In FIG. 3, the clock stop signal CSTOP is supplied to a flip flop 80 to be kept therein. The shift mode pulse SM is received by a group of AND gates 81 to be delivered to each of the package units 41 through 43 and the indicator 55. As a result, each flip flop of the respective package units and indicator 55 is put into the shift mode.

The package address signal PKA is supplied to a decoder 82 of the SFCA 71 to enable one of the NAND gates collectively depicted at 83. Each of the NAND gates 83 is given the logic "1" level through a single NAND gate 84 because the all selection signal ALSEL disappears. Only one of the NAND gates 83 supplies the logic "1" level to a plurality of AND gates collectively shown by a single reference numeral 85.

The clock pulses CK are supplied through an AND/NAND gate 86 to a single AND gate 87 coupled to the flip flop 80 through a NAND gate (unnumbered). For the time being, the clock stop signal CSTOP is kept in the flip flop 80 and, therefore, the AND gate 87 is disabled to intercept the clock pulses CK. Thus, the clock pulses CK are not delivered by the AND gates 85 as a result of the interception of the clock pulses CK by the AND gate 87.

Under these circumstances, when the clock stop signal CSTOP disappears, the clock pulses CK are delivered through one of the AND gates 85 to a selected one of the package units and the indicator 55 in accordance with the package address signal PKA.

Responsive to the clock pulses CK, the selected package unit or indicator 55 shifts the status signals kept therein to a selector 88 of the SFCA 71. The selector 88 selects the shift-out status signals in accordance with the package address signal PKA supplied from the decoder 82 and produces the shift-out status signals as a shift-out data string SO. The shift-out data string SO is supplied through the diagnostic interface 31 and the PIA 78 (FIGS. 5 and 6) to the DGM 76 (FIG. 5). When the shift-out data string SO is read out of every one of the package units and indicator and is stored in the DGM 30, the stage S₁ is completed and followed by a second stage S₂ (FIG. 7). From this fact, it is readily understood that the retry enable signal is sent from the indicator 55 to the DGM 76 as one of the shift-out data string SO.

In the diagnostic unit 30, the microprocessor 75 accesses the DGM 76 to derive the retry enable signal from a predetermined address allotted to the indicator

55. If no retry enable signal is stored in the predetermined address, retry is impossible as regards the particular instruction even when operation of the first processor 21 is taken over by the second processor 22. Therefore, the diagnostic unit 30 produces a shut-down interruption request SHUT indicative of isolation of the first processor 21, as shown by a third stage $S_3$. The shut-down interruption request SHUT is supplied to the second processor 22 to isolate the first processor 21 from the computer system. Thus, recovery operation is finished in the diagnostic unit 30.

In the second stage $S_2$ illustrated in FIG. 7, when the retry enable signal is stored in the predetermined address allotted to the indicator 55, recovery operation is started between the diagnostic unit 30 and the first processor 21 to retry the particular instruction in the first processor 21. As depicted by a fourth stage $S_4$ in FIG. 7, use is made of the status signals which are derived from the software visible registers and which are stored in those addresses of the DGM 76 which are allotted to the software visible registers.

More specifically, the DGM 76 comprises an initial data area for preliminarily storing an initial status signal representative of initial status of every flip flop besides a shift-out data area for storing the shift-out data, namely, the status signals derived from the respective registers. The status signals from the software visible registers are transferred from the shift-out data area to the initial data area. As a result, modified or edited signals are left in the initial data area by combining the initial status signals with the status signals derived from the software visible registers, as shown by the fourth stage $S_4$ in FIG. 7. Thus, edition is made for the status signals of the software visible registers to retry the particular instruction in the first processor 21.

It is to be mentioned here that the retry should be carried out as regards the particular instruction alone, of which execution has given rise to the error. Otherwise, it is impossible to know whether or not the error disappears by the retry operation. Generally, it is possible to process a single instruction alone by controlling a preselected flip flop (not shown). The initial status signal of the preselected flip flop is also stored in a preselected address of the initial data area of the DGM 76. In a fifth stage $S_5$, the preselected address of the DGM 76 is loaded with a single instruction mode signal indicative of execution of a single instruction to send the single instruction mode signal to the preselected flip flop.

Under these circumstances, the diagnostic unit 30 resets the first processor 21 in a well-known manner, as shown by a sixth stage $S_6$ in FIG. 7.

Subsequently, the edited signals and the single instruction mode signal are shifted as a shift-in data string SI from the initial data area of the DGM 76 into the respective flip flops of each of the package units illustrated in FIG. 3. As a result, the edited signals and the single instruction mode signal are written in the software visible registers and the preselected register, respectively, as shown by a seventh stage $S_7$ in FIG. 7. Each of the remaining registers is put into the initial status. Therefore, operation at the seventh stage is named write-in operation hereinafter.

Such write-in operation is carried out in the following manner. Like in the readout operation described in conjunction with the first stage $S_1$, the shift mode pulse SM and the package address signal PKA are supplied from the diagnostic unit 30 to the SFCA 71 (FIG. 3) through the diagnostic interface 31, with the all selection signal ALSEL interrupted by the diagnostic unit 30. Accordingly, the clock pulses CK are selectively delivered from the diagnostic unit 30 to the package units selected by the package address signal PKA when the clock stop signal CSTOP is released.

The shift-in data string SI is also sent from the DGM 76 to the SFCA 71 through the diagnostic interface 31 in timed relation to the clock pulses CK. As illustrated in FIG. 3, the shift-in data string SI is delivered from a plurality of AND gates collectively depicted by 91 to one of the package units supplied with the clock pulses CK. Thus, the edited signals and the single instruction mode signal are kept in the software visible registers and the preselected register, respectively.

Next, a retry start signal RTRY (FIG. 6) is supplied from the diagnostic unit 30 to the first processor 21, as shown by an eighth stage $S_8$. The first processor 21 receives the retry start signal RTRY at the control unit 35 thereof to retry the particular instruction by the use of the edited signals and the single instruction mode signal kept in the softward visible registers and the preselected register, respectively.

Prior to production of the retry start signal RTRY, the diagnostic unit 30 deenergizes the shift mode pulse SM, and the package address signal PKA while it puts the all selection signal ALSEL into the logic "1" level to enable the first processor 21 to retry the particular instruction, although not shown in FIG. 7.

After production of the retry start signal RTRY, a preselected period is measured in the diagnostic unit 30 by the use of a timer (not shown) to monitor completion of the retry operation, as shown by a ninth stage $S_9$ in FIG. 7.

When the preselected period elapses, operation of the diagnostic unit 30 proceeds to a tenth stage $S_{10}$ in which flip flop readout operation is carried out, like in the first stage $S_1$. As a result, the respective package units and the indicator 55 shift out status signals and a retry enable signal resulting from the retry operation, respectively, as a retry shift-out data string. The retry shift-out data string is sent from the SFCA 71 to the DGM 76 through the diagnostic interface 31 in a manner similar to the shift-out data string SO described in conjunction with the first stage $S_1$.

As shown in FIG. 7, the tenth stage $S_{10}$ is followed by an eleventh stage $S_{11}$ to check whether or not any error appears in the retry shift-out data string. If no error signal ER is supplied from the error detecting circuits 46 through 48, it may be considered that the error formerly accompanying the particular instruction is removed by the retry operation. This means that the former error was not a hardware or long-lived error. Thus, when it appears that no hardware error takes place as regards the particular instruction by the retry operation, the retry status signals from the software visible registers are edited again in a twelfth stage $S_{12}$ to edit shift-out data signals in the initial data area of the DGM 76 in a manner described in the fourth stage $S_4$.

The first processor 21 is reset as shown in a thirteenth stage $S_{13}$ after edition of the shift-out data signals. The shift-out data signals are shifted out in the form of a shift-in data string SI to write the status signals into the software visible registers of the first processor 21, as shown in a fourteenth stage $S_{14}$. The write-in operation or flip flop set operation is similar to that of the seventh stage $S_7$, except that the single mode instruction signal is not included in the shift-out data signals moved in the fourteenth stage $S_{14}$.

After the status signals and the initial status data signals are set in the software visible registers and the remaining registers, respectively, the diagnostic unit 30 supplies a retry start signal RTRY to the first processor 21, as shown in a fifteenth stage $S_{15}$. As a result, the first processor 21 processes the particular instruction again and, thereafter, the following instructions.

In the eleventh stage $S_{11}$, the diagnostic unit 30 assumes occurrence of a hardware error in the first processor 21 when any error signal ER is again supplied from the first processor 21 to the diagnostic unit 30. On the above-mentioned assumption, operation of the diagnostic unit 30 is advanced from the eleventh stage $S_{11}$ to a sixteenth stage $S_{16}$.

At the sixteenth stage $S_{16}$, the diagnostic unit 30 searches for a retry enable signal of the retry shift-out data signals in a manner similar to that of the second stage $S_2$. If no retry enable signal is included in the retry shift-out data signals, the sixteenth stage $S_{16}$ is followed by the third stage $S_3$ to supply the shut-down interruption signal to the second processor 22. As described in conjunction with the third stage $S_3$, the first processor 21 is finally isolated from the computer system under control of the second processor 22.

If a retry enable signal is included in the retry shift-out data signals, the diagnostic unit 30 detects or responds to the retry enable signal.

In this case, the retry enable signal appears twice at the second and the sixteenth stages $S_2$ and $S_{16}$. It may be considered that both of the retry enable signals result from the same error that takes place on processing the particular instruction in the first processor 21. Under the circumstances, the diagnostic unit 30 judges the error to be a hardware or long-lived error and advances its operation from the sixteenth stage $S_{16}$ to a seventeenth stage $S_{17}$.

In the seventeenth stage $S_{17}$, the diagnostic unit 30 delivers a relief interruption signal RELIEF to the second processor 22 through the diagnostic interface 31. The relief interruption signal RELIEF is indicative of relief or replacement from the first processor 21 to the second processor 22 and is received by the interruption register 89 (FIG. 3) of the second processor 22. The diagnostic unit 30 interrupts recovery operation thereof for a while after production of the relief interruption signal RELIEF.

Since the interruption register 89 is referenced by any program or software of the second processor 22, the relief interruption signal RELIEF is interpretted by the program to carry out operation necessary for relief interruption.

Referring to FIG. 8 afresh and again to FIGS. 2 and 3, the second processor 22 watches the interruption register 89 under control of the program after completion of one of the instructions fetched by the second processor 22 that is currently executed. The software visible registers in the second processor 22 has already been cleared before the interruption register 89 is watched. When the relief interruption signal RELIEF is derived from the interruption register 89, the second processor 22 fetches the swap and start (SAS) instruction (mentioned before in connection with FIG. 2) to keep the same in the instruction register 36. The SAS instruction kept in the instruction register 37 makes the decoder produce the swap request signal SW, as shown at an eighteenth stage $S_{18}$ near the top in FIG. 8.

The swap request signal SW is sent to the respective package units 41 through 43 through the second OR gate 52. As a result, each of the flip flops in the respective package units comes to a halt in response to the swap request signal SW.

From this fact, it is readily understood that a combination of the instruction register 36, the decoder 37, and the second OR gate 52 is energized on occurrence of the error in the first processor 21 and serves to suspend the executing section 38 of the second processor 22 after completion of execution of the instruction which is currently executed by the second processor 22.

The swap request signal SW is also sent as a ready signal to the diagnostic unit 30 through the second diagnostic interface 31b coupled to the decoder 37. Therefore, the second diagnostic interface 31b is operable to produce the ready signal after completion of execution of the instruction currently executed.

In order to produce a ready signal, use may be possible of another generator energized by the swap request signal SW.

Referring to FIGS. 5 and 8 again, the diagnostic unit 30 is energized in response to the ready or swap request signal SW to supply the second processor 22 with a reset signal, as shown at a ninteenth stage $S_{19}$ in FIG. 8, to reset the second processor 22 in a usual manner.

It should be recalled that the DGM 76 previously stores the status data signals read out from the respective registers of the first processor 21, especially, the software visible registers, as shown at the tenth stage $S_{10}$ in FIG. 7.

In a twentieth stage $S_{20}$ illustrated in FIG. 8, the diagnostic unit 30 shifts out the stored status data signals from the DGM 76 into the respective registers of the second processor 22 in the form of a shift-out data string SO. The shift-out data string SO is set in the respective flip flops in the second processor 22. Thus, the software visible registers of the second processor 22 are loaded with the status signals derived from the software visible registers of the first processor 21. Such write-in operation per se is similar to that described in the seventh stage $S_7$ (FIG. 7) except that the shift-out data string is sent to the second processor 22.

As to the diagnostic unit 30, the retry enable signal and the swap signal SW produced in the first and the second processors 21 and 22 are received by the PIA 78 to be sent to the microprocessor 75 and the DGM 76. In addition, the microprocessor 75 delivers the status signals directly from the DGM 76 to the registers of the second processor 22 without passing through the main memory 20.

Under the circumstances, a retry start signal RTRY is sent from the PIA 78 of the diagnostic unit 30 to the second processor 22, as shown at a twenty-first stage $S_{21}$ near the bottom in FIG. 8. Thus, the second processor 22 is enabled to take over execution of the particular instruction. After execution of the particular instruction from the first processor 21, the second processor 22 processes the program allotted to the first processor 21 in addition to programs for the second processor 22, in a usual manner.

In the example being illustrated, the error signal ER produced in the first processor 21 is supplied from the first processor 21 to the PIA 78. The PIA 78 serves to access the indicator 55 of the first processor 21 by producing the shift mode pulse SM and the package address signal PKA and to make the indicator 55 transfer the retry enable signal to the DGM 76.

Figure 9:
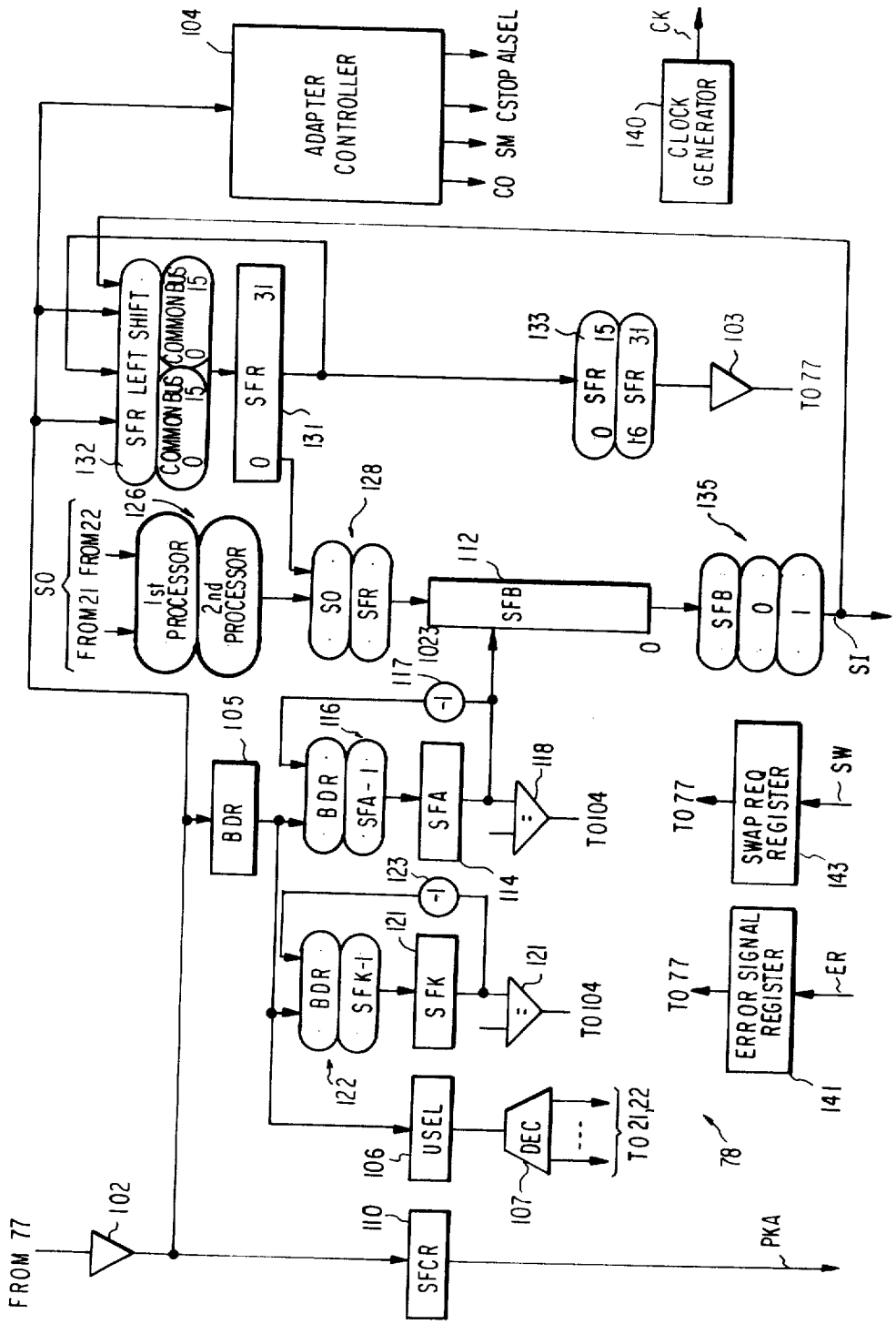
FIG. 9 is a detailed block diagram of a portion of the diagnostic unit illustrated in FIG. 5.

Referring to FIG. 9, description will specifically be directed to the PIA 78 for use in the error recovery system of this invention. The PIA 78 comprises a receiver 102 and a driver 103 each being coupled to the common bus 77 of sixteen bits (also in FIG. 5). The PIA 78 is coupled to the diagnostic interface 31 as best shown in FIG. 6 to receive the error siganl ER, the shift-out data string SO, and the swap request signal SW and to supply the shift-in data string SI and the package address signal PKA to the diagnostic interface 31. In order to send to the diagnostic interface 31 the remaining signals, such as the shift mode signal SM, the package all selection signal ALSEL, the clock stop signal CSTOP, and the like, the PIA 78 comprises an adapter controlled 104 put into operation in response to a sequence of commands delivered from the microprocessor 75. Besides the above-mentioned various signals, the adapter controller 104 produces a sequence of control pulses CO to the other portions of the PIA 78, as will later be described.

The PIA 78 comprises a bus data register (BDR) 105 of sixteen bits responsive to various data signals (to be described later) supplied from the microprocessor 75. The BDR 105 is coupled through a unit selecting register (USEL) 106 to a decoder 107 for selectively energizing either one of the first and the second processors 21 and 22.

The PIA 78 further comprises a shift control register (SFCA) 110 of sixteen bits responsive to the package address signal PKA and a buffer memory (herein named SFB) 112 of one bit by 1024 addresses for storing the shift-out data string SO sent from the diagnostic interface 31 to the DGM 76 and the shift-in data string SI sent from the DGM 76 to the diagnostic interface 31. Such address of the SFB 112 is specified by an address signal of ten bits representative of one of address numbers from "0" to "1023." The number "1023" is represented by 3FF in the hexadecimal notation.

In order to indicate each address of the SFB 112 by production of the address signal, the SFB 112 is coupled to an address register (SFA) 114 also coupled to the BDR 105 through a first two-way selector 116. The SFA 114 is connected to a subtractor 117 coupled to the first two-way selector 116. The subtractor 117 subtracts unity from an address number represented by the address signal kept in the SFA 114 and supplies the result (SFA-1) of subtraction to the first two-way selector 116. In general, each selector illustrated in FIG. 9 is operable to select one of input signals supplied from a plurality of ways or routes thereto and has legends representative of input signals or input portions. As to the first two-way selector 116, selection is carried out for input signals supplied from the BDR 105 and the subtractor 117.

A first comparator 118 is coupled to the SFA 114 to compare a content of the SFA 118 with zero and to supply the adapter controller 104 with a first coincidence signal when the content coincides with zero.

A counter 121 of five bits is coupled to the BDR 105 through a second two-way selector 122 connected to a second subtractor 123. The counter 121 is for counting the number of data bits shifted into the SFB 112, as will later be described. The counter 121 is related in operation to the SFB 112 and will therefore be typified by SFK, hereinafter. A second comparator 124 is coupled to the SFK 121 and is similar in operation to the first comparator 118.

In FIG. 9, the shift-out data string SO is shifted into the SFB 112 through a selector 126 and a third two-way selector 128. In practice, the selector 126 is coupled to the main memory 20, the IOP's 26 and 27, and the system control unit 24 besides the first and the second processors 21 and 22 described within the selector block.

A shift register (SFR) 131 of thirty-two bits is coupled to a fourth two-way selector 132 and a fifth two-way selector 133. Furthermore, the SFR 131 is coupled at the most significant bit (depicted by "0") to the third two-way selector 128. The fourth two-way selector 132 is coupled to the receiver 102 and a three-way selector 135 connected to the SFB 112. In addition, the fourth two-way selector 132 is responsive to a content of the SFR 131. This means that the content of the SFR is shifted left by one bit when the three-way selector 135 is selected by the fourth two-way selector 132, as will later be described in detail.

The common bus 77 of sixteen bits is coupled to each of the receiver 102 and the driver 105. On the other hand, use is made of the SFR 131 of thirty-two bits. The fourth and the fifth two-way selectors 132 and 133 are for serving to match the SFR 131 with the common bus 77.

Referring to FIG. 10 anew and FIG. 9 again, readout operation shown at the first and the tenth stages $S_1$ and $S_{10}$ (FIG. 7) is started by indicating, from the microprocessor 75, a unit code of four bits allotted to each of the first and the second processors 21 and 22. Although a similar unit code is assigned to each of the main memory 20, the system control unit 24, and the IOP's 26 and 27, it is left out of consideration in the instant specification.

Herein, it is assumed that the unit code specifies the first processor 21. The unit code is sent to the USEL 106 from the microprocessor 75 through the receiver 102 and the BDR 105 under control of the adapter controller 104, as shown at a first additional step $SP_1$. The unit code is decoded by the decoder 108 and is delivered to the first processor 21.

The adapter controller 104 delivers the clock stop signal CSTOP to the first processor 21 to stop supply of the clock pulses CK to the first processor 21 at a second additional step $SP_2$. The step $SP_2$ is followed by a third additional step $SP_3$, in which the all selection signal ALSEL is put into the logic "0" level by the adapter controller 104 responsive to a prescribed one or a first one of the commands.

Next, the package address signal PKA is sent from the microprocessor 75 to be kept in the SFCA 110, as shown in a fourth additional step $SP_4$ and to specify one of the package units in the first processor 21.

Now, a fifth additional step $SP_5$ is for shifting or reading the status signals out of the package unit specified by the package address signal PKA. This operation is called shift-out operation for convenience of description.

Figure 11:
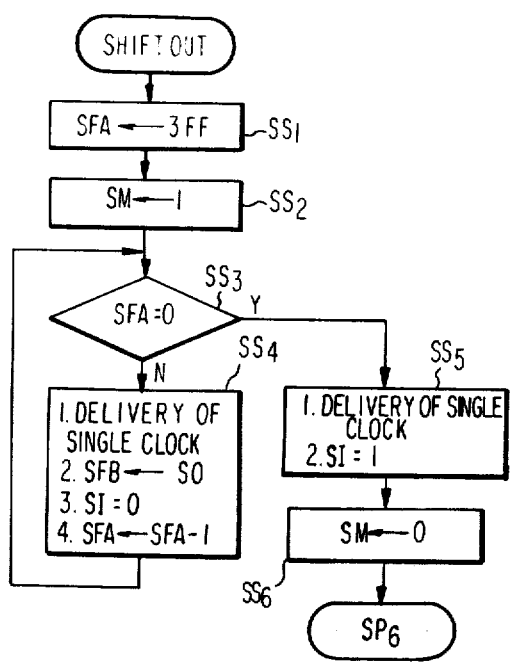
FIG. 11 is a flow chart of shift-in operation appearing in FIG. 10.

Temporarily referring to FIG. 11, the shift-out operation is started from a first subsidiary step $SS_1$. In the subsidiary step $SS_1$, use is made of the SFB 112 of 1024 bits and the SFA 114 of ten bits for indicating each bit address of the SFB 112. The bit capacity or number of the SFB 112 is larger than the maximum number of all flip flops included in each package unit. This means that the SFB 112 is capable of storing all of the status signals supplied from every one of the package units.

As shown at the first subsidiary step SS$_1$, in FIG. 11, the SFA 114 is supplied with a constant number signal representative of decimal 1023 or hexadecimal 3FF. The constant number signal specifies the maximum address number "1023" of the SFB 112 and is sent from the microprocessor 75 to the SFA 114 through the BDR 105 and the first two-way selector 116.

In FIG. 11, the first subsidiary step SS$_1$ is followed by a second subsidiary step SS$_2$ to produce the shift mode pulse SM. For this purpose, the adapter controller 104 is energized by a second one of the commands sent from the microprocessor 75.

Under the circumstances, a third subsidiary step SS$_3$ is carried out after the second subsidiary step SS$_2$ by the use of the first comparator 118. At present, the first comparator 118 does not produce any output signal because the constant number is not equal to the value "0."

In this state, the PIA 76 proceeds to a fourth subsidiary step SS$_4$. As shown in FIG. 11, a single clock pulse CK is first delivered from the clock pulse generator 140 to the related portions. As a result, the first bit of the shift-out data string SO produced by the first processor 21 is shifted into the SFB 112 from the diagnostic interface 31 through the selectors 126 and 128 under control of the adapter controller 104. Thus, the first bit of the shift-out data spring SO is kept in the maximum number address of the SFB 112. At the same time, the package unit in question is supplied with the logic "0" level through the three-way selector 135 as the first bit of the shift-in data string SI. The logic "0" level is kept in the first stage, for example, 56 (FIG. 3) of the flip flops of the above-mentioned package unit that is rendered empty by the shift-out operation. Production of the logic "0" level is accomplished by selecting a predetermined value "0" by the three-way selector 135. The predetermined value "0" is given to the three-way selector 135 from a constant value generator (not shown) together with another predetermined value "1."

On the other hand, the SFA 114 is supplied with the result (SFA-1) of subtraction from the first subtractor 117 through the first two-way selector 116.

Thereafter, the third subsidiary step SS$_3$ is carried out again to compare the content of the SFA 114 with zero. Similar operation is repeated at the fourth subsidiary step SS$_4$ as long as the content of the SFA 114 does not coincide with zero.

When the content of the SFA 114 coincides with zero, a single clock CK is delivered from the clock generator 140 (FIG. 9). Simultaneously, the logic "1" level is supplied through the three-way selector 135 to the package unit as the last bit of the shift-in data string SI, as shown at a fifth subsidiary step SS$_5$.

Under these circumstances, the SFB 112 stores the shift-out data string SO from the maximum number address in the direction of the minimum number address by the number of the flip flops included in the package unit in question. On the other hand, all of the flip flops hold the logic "0" level except the first stage of the flip flops which is connected to the input side of the package unit and is supplied with the logic "1" level.

The shift-out operation is finished by halting the shift mode pulse SM by the use of the adapter controller 104, as shown at a sixth subsidiary step SS$_6$.

Turning back to FIG. 10, the shift-out operation (SP$_5$) described with reference to FIG. 11 is followed by a sixth additional step SP$_6$. At the step SP$_6$, the status signals stored into the SFB 112 are shifted into, namely, returned back to the package unit in question of the first processor 21 with the status signals kept in the SFB 112. This operation is named shift-in operation for convenience of description.

As regards the readout operation illustrated in FIG. 10, this shift-in operation is not always necessary. In the example being illustrated, the shift-in operation is carried out so that an external device (not shown) may check contents of the package units.

It should be recollected that the logic "1" level is kept in only the first stage of the flip flops, such as the flip flop 56 (FIG. 3). It is possible to correctly return the status signals back to a shift register of the package unit by monitoring the logic "1" level in the diagnostic unit 30. During the shift-in operation, the shift register in question successively produces from the last stage flip flop a sequence of data signals which is previously written in the shift register on the shift-out operation and which includes only one logic "1" level. Since the data signal sequence is sent to the diagnostic unit 30 as the shift-out data string SO, the diagnostic unit 30 is capable of detecting completion of the shift-in operation by monitoring the logic "1" level included in the shift-out data string SO.

Figure 12:
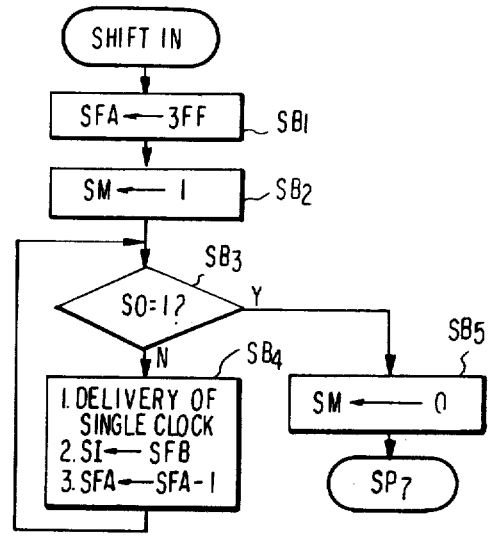
FIG. 12 is a flow chart of shift-out operation also appearing in FIG. 10.

Temporarily referring to FIG. 12, the shift-in operation is similar to the shift-out operation of FIG. 11 in that the SFA 114 is given the number of 3FF at a first subordinate step SB$_1$ and the shift mode pulse SM is produced from the adapter controller 104 at a second subordinate step SB$_2$. At a third subordinate step SB$_3$, the shift-out data string SO is monitored to detect the logic "1" level in a well-known manner.

While the logic "1" level does not appear in the shift-out data string SO, a fourth subordinate step SB$_4$ is carried out after the third subordinate step SB$_3$. At the subordinate step SB$_4$, a single clock CK is produced from the clock generator 140 and one data signal is read out of the maximum address number of the SFB 112 as the shift-in data string SO. Thereafter, the SFA 114 is supplied with the result (SFA-1) of subtraction.

Subsequently, the third subordinate step SB$_3$ is repeated again. Similar operation is repeatedly carried out until the logic "1" level is detected from the shift-out data string SO.

If the logic "1" level appears in the shift-out data string SO, a fifth subordinate step SB$_5$ follows the third subordinate one SB$_3$ to put the shift mode pulse SM into the logic "0" level. Thus, the shift-in operation is completed.

Referring to FIG. 10 again, the shift-in operation depicted at the sixth additional step SP$_6$ is followed by a seventh additional step SP$_7$. At the seventh additional step SP$_7$, the hexadecimal 3FF is kept in the SFA 114, as are the cases with the steps SS$_1$ and SB$_1$ illustrated in FIGS. 11 and 12.

After the seventh additional step SP$_7$, the microprocessor 75 carries out calculation specified by the Gauss' notation at an eighth additional step SP$_8$. More specifically, the microprocessor 75 adds the number of the flip flops of the package unit to a predetermined number of "31" to derive the sum of the two numbers and, thereafter, divides the sum by another predetermined number of "32" to calculate a quotient. The quotient is kept in the first general register 79a as illustrated in FIG. 5.

The eighth additional step SP$_8$ is related to the use of the SFR 131 of thirty-two bits illustrated in FIG. 9, as will become clear as the description proceeds.

The quotient is compared with zero by the microprocessor 75 at a ninth additional step SP$_9$. Unless the quotient is equal to zero, the ninth additional step SP$_9$ is followed by a tenth additional step SP$_{10}$ in which the status signals are transferred from the SFB 112 to the DGM 76 through the SFR 131 and the fifth two-way selector 133, both being illustrated in FIG. 9. Since the status signals are finally stored in the DGM 76, this transfer operation will be named SFB store operation, hereinafter.

Figure 13:
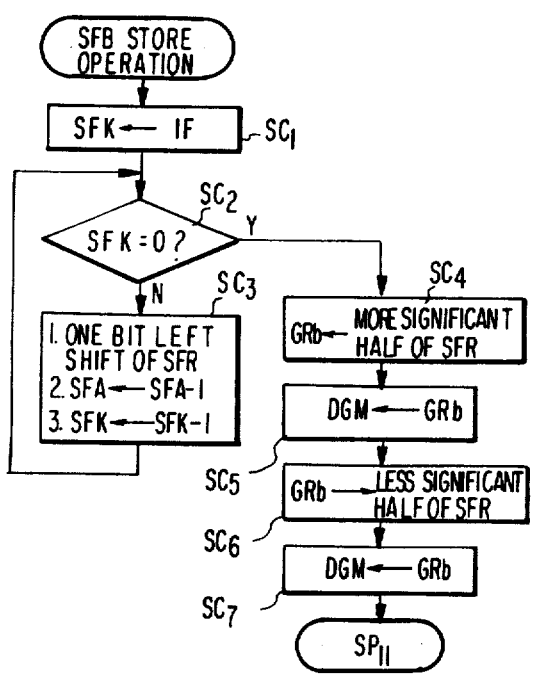
FIG. 13 is a flow chart of store operation used in the readout operation illustrated in FIG. 10.

Referring to FIG. 13 for a while, the counter or SFK 121 of five bits illustrated in FIG. 9 is loaded from the microprocessor 75 with a preselected number of "31" represented by 1F in the hexadecimal notation, as shown at a first step SC$_1$. It should be noted here that the preselected number of "31" is related to the bit capacity of the SFR 131.

A content of the SFK 121 is compared with zero by the use of the second comparator 124 at a second step SC$_2$. Inasmuch as the content of the SFK 121 is not equal to the preselected number at present, the second step SC$_2$ is succeeded by a third step SC$_3$. At the third step SC$_3$, a single bit signal is read out of the SFB 112 to the SFR 131 through the three-way selector 135 and the fourth two-way selector 132. The single bit signal is derived from the address specified by the hexadecimal 3FF which is set in the SFA 114 at the additional step SP$_7$ of FIG. 10. Responsive to the single bit signal, the fourth two-way selector 132 shifts the SFR 131 left by one bit and makes the single bit signal stored at the least significant bit of the SFR 131. Further, subtraction is carried out by the first and the second subtractors 117 and 123 at the third step SC$_3$.

After completion of the third step SC$_3$, operation is returned back to the second step SC$_2$. The second and the third steps SC$_2$ and SC$_3$ are repeated until the content of the SFK 121 becomes equal to zero. At this time, the SFR 131 is filled up by the status signals from the least significant bit ("31") to the most significant bit ("0") thereof.

Under the circumstances, the status signals of thirty-two bits are transferred from the SFR 131 to the second general register 79b (FIG. 5) sixteen bits at a time. In the example being illustrated, the more significant half of the status signals is first transferred to the second general register 79b at a fourth step SC$_4$ and is, thereafter, stored in the DGM 76 as shown at a fifth step SC$_5$. Subsequently, the less significant half of the status signals is transferred from the SFR 131 to the second general register 79b and, thereafter, from the second general register 79b to the DGM 76, as shown at sixth and seventh steps SC$_6$ and SC$_7$.

Turning back to FIG. 10, the SFB store operation at the tenth additional step SP$_{10}$ is succeeded by an eleventh additional step SP$_{11}$. At the eleventh additional step SP$_{11}$, the microprocessor 75 subtracts unity from the quotient or content of the first general register 79a and, thereafter, carries out operation of the ninth additional step SP$_9$.

When the content of the first general register 79a becomes equal to zero, transfer is completed of all of the status signals kept in the SFB 112.

Therefore, the adapter controller 104 puts the all selection pulse ALSEL into the logic "1" level to deliver the clock pulses CK to the first processor 21, as shown at a twelfth additional step SP$_{12}$.

Referring to FIG. 14 together with FIG. 9, the write-in operation shown at the stages S$_7$ and S$_{20}$ in FIGS. 7 and 8 is for transferring the status signals from the DGM 76 to a package unit of the first or the second processor 21 or 22 in accordance with the package address signals PKA. Herein, let the status signals be delivered to the first processor 21.

In the write-in operation, the USEL 106 is loaded with the unit code specifying the first processor 21, as shown at a first additional step ST$_1$ in FIG. 14. Next, the adapter controller 104 produces the clock stop signal CSTOP to stop supply of the clock pulses CK to the first processor 21, as shown at a second additional step ST$_2$. At a third additional step ST$_3$, the adapter controller 104 puts the all selection pulse ALSEL into the logic "0" level. As a result, it becomes possible to selectively supply the package units of the first processor 21 with the clock pulses CK interrupted at present. In order to selectively energize the package units of the first processor 21, the package address signals PKA are sent from the SFCR 110 illustrated in FIG. 9 to the diagnostic interface 31 at a fourth additional step ST$_4$.

Under the circumstances, the shift-out operation is carried out at a fifth additional step ST$_5$ in a similar manner to the additional step SP$_5$ illustrated with reference to FIG. 10. As a result, the status signals are extracted from the package unit in question into the SFB 112.

As are the cases with the seventh and eighth additional steps SP$_7$ and SP$_8$ (FIG. 10), the SFA 114 and the first general register 79a are loaded with the number of 3FF and a quotient obtained by calculation similar to that described at the eighth additional step SP$_8$, as shown at sixth and seventh additional steps ST$_6$ and ST$_7$, respectively.

Like in the ninth additional step SP$_9$ (FIG. 10), a content of the first general register 79a is detected by the microprocessor 75 at an eighth additional step ST$_8$.

The eighth additional step ST$_8$ is succeeded by a ninth additional step ST$_9$ unless the content of the first general register 79a is equal to zero. At the ninth additional step ST$_9$, the SFB 112 is loaded from the DGM 76 with data signals, namely, write-in data signals, to be written into the package unit in question. Accordingly, this operation is named SFB load operation.

Figure 15:
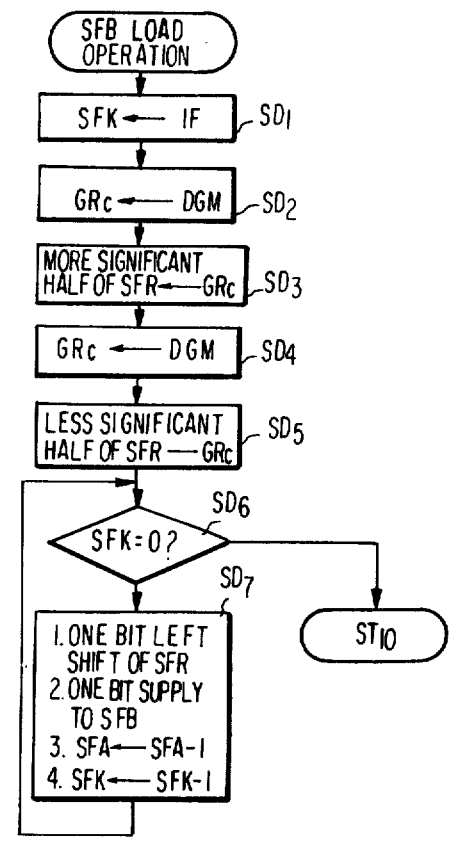
FIG. 15 is a flow chart of register load operation appearing in FIG. 14.

Temporarily referring to FIG. 15, the SFB load operation is started by putting the hexadecimal 1F into the SFK 121 at a first step SD$_1$, like in the step SC$_1$ described with reference to FIG. 13.

The more significant half of the write-in data signals is sent from the DGM 76 to the third general register 79c, as shown at a second step SD$_2$, and are kept in the more significant half bit positions of the SFR 131, as shown at a third step SD$_3$. Similarly, the less significant half of the write-in data signals is sent through the third general register 79c to the less significant half bit positions of the SFR 131, as shown at fourth and fifth steps SD$_4$ and SD$_5$. Thus, the SFR 131 is filled up by the write-in data signals of thirty-two bits.

Subsequently, a content of the SFK 121 is looked up to detect whether or not the content is equal to zero, at a sixth step SD$_6$. If the content of the SFK 121 is not equal to zero, the step SD$_6$ is followed by a seventh step SD$_7$. At the seventh step SD$_7$, the SFR 131 is shifted left by one bit. As a result, one bit of the write-in data signals is supplied from the most significant bit position of the SFR 131 to the SFB 112. Thereafter, subtraction is carried out, as described at the step SC$_3$ of FIG. 13.

When the write-in data signals of thirty-two bits are all transferred from the SFR 131 to the SFB 112, the content of the SFK 121 becomes equal to zero. At this time, the SFB load operation is completed and is succeeded by a tenth additional step $ST_{10}$ illustrated in FIG. 14.

Referring to FIG. 14 again, subtraction of the first general register 79a is carried out in the microprocessor 75 at the tenth additional step $ST_{10}$ following the SFB load operation ($ST_9$). When all of the write-in data signals are stored in the SFB 112 through the SFR 131, the content of the first general register 79a becomes zero. As a result, operation is shifted from the eighth additional step $ST_8$ to an eleventh additional step $ST_{11}$. At the eleventh additional step $ST_{11}$, the write-in data signals are shifted into the package unit in the form of a shift-in data string SI in a manner described in the sixth additional step $SP_6$ of FIG. 10.

After completion of shift-in operation, the package all selection pulse ALSEL is sent to the package unit in question to supply the same with the clock pulses CK. Thus, the write-in operation is finished.

From the above-mentioned operation, it is readily understood that the adapter controller 104 serves to access the indicator 55 of the first processor 21 by producing the shift mode signal SM and the package address signal PKA and by cooperating with the microprocessor 75 supplied with the error signal ER through an error signal register 141 shown in FIG. 9. As a result, the retry enable signal is transferred from the accessed indicator 55 to the microprocessor 75 through the SFB 112 as one bit signal of the shift-out data string SO.

In addition, the swap request or ready signal SW is sent from the second processor 22 to the microprocessor 75 through a swap request register 143 illustrated in FIG. 9. Responsive to the swap request signal and the retry enable signal, the microprocessor 75 delivers the status signals from the DGM 76 to the registers of the second processor 22 in cooperation with the SFR 131 and the SFB 121 as the shift-in data string SI. The shift-in data string SI is directly sent from the diagnostic unit 30 to the second processor 22 without passing through the main memory 20. Thus, the second processor 22 takes over execution of the particular instruction.

Figure 16:
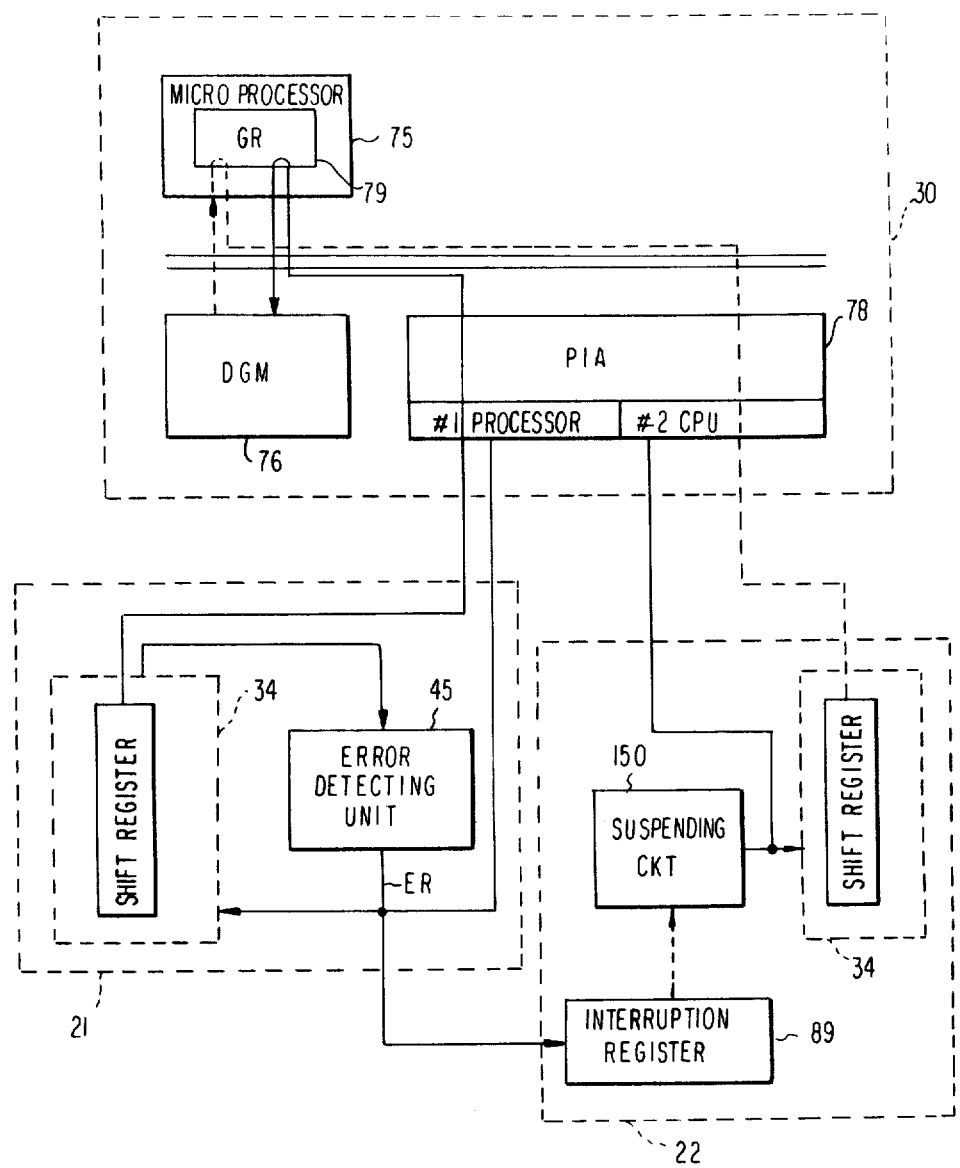
FIG. 16 is a block diagram of an error recovery system according to another embodiment of this invention.

Referring to FIG. 16, an error recovery system according to a second embodiment of this invention is for use in combination with an electronic digital computer system comprising similar parts designated by like reference numerals. In the computer system, it is surmised that an error may take place in the first processor 21 and that the status signals are transferred from the first processor 21 to the second processor 22 after occurrence of the error. Under the circumstances, the first and the second processors 21 and 22 are considerably simplified.

In FIG. 16, the first processor 21 is represented by a logic circuit unit 34 and an error detecting unit 45 coupled to the logic circuit unit 34. The logic circuit unit 34 is typified by a single shift register which is formed by a plurality of flip flops. Herein, the indicator 55 illustrated in FIGS. 2 and 3 and formed by a single flip flop is assumed to be included in the flip flops to produce a retry enable signal.

When the error takes place in the logic circuit unit 34, the error detecting unit 45 produces an error signal ER. Responsive to the error signal ER, operation of the logic circuit unit 34 is stopped at a particular one of instructions allotted to the first processor 21, with the status signals kept in each flip flop.

In the illustrated computer system, the error signal ER is delivered from the first processor 21 to both of the diagnostic unit 30 and the second processor 22. In the diagnostic unit 30, the error signal ER is transferred from the PIA 78 to the microprocessor 75, although not explicitly illustrated in this figure. Responsive to the error signal ER, the microprocessor 75 accesses the logic circuit unit 34 of the first processor 21 by carrying out the readout operation described with reference to FIG. 10. The status signals are sent as a shift-out data string SO from the first processor 21 through the PIA 78 and the general register 79 to the DGM 76.

When the retry enable signal is detected in the shift-out data string from the first processor 21, the particular instruction is retried in the first processor 21 after the write-in operation described with reference to FIG. 14. For brevity of description, it is assumed that a retry enable signal appears again as a result of the retry operation and is sent from the first processor 21 to the diagnostic unit 30 together with the other status signals by the readout operation.

On the other hand, the error signal ER sent to the second processor 22 is kept in an interruption register 89 similar to that of FIG. 3. Like in FIG. 3, the interruption register 89 is accessed by a program allotted to the second processor 22 to interpret the error signal ER. When the error signal ER is interpreted in the second processor 22, the second processor 22 processes an interrupting instruction after completion of execution of one instruction which is currently executed. As a result, an interruption request is supplied to a suspending circuit 150 corresponding to the decoder 37 and the second OR gate 52 illustrated in FIG. 2, as symbolized by a broken line. Thus, the interruption register 89 serves to produce an interruption request in cooperation with a program executed in the second processor 22.

Responsive to the interruption request, the suspending circuit 150 is enabled to produce an output signal and suspend a logic circuit unit 34 of the second processor 22 by the output signal. Simultaneously, the output signal is transferred as a ready signal to the PIA 78 as detailed in conjunction with FIG. 9.

When the diagnostic unit 30 is supplied with the ready signal and retry enable signal resulting from the retry operation, the diagnostic unit 30 supplies the status signals from the DGM 76 to a shift register of the second processor 22 through the PIA 78 by the write-in operation. After the shift register is loaded with the status signals, the second processor 22 executes the particular instruction to recover the error taking place in the first processor 21.

While this invention has thus far been described in conjunction with a few embodiments thereof, it will be readily possible for those skilled in the art to put this invention into practice in various other manners. For example, retry operation described in connection with the stages $S_7$, $S_8$, and $S_9$ in FIG. 7 may be carried out by the second processor 22 rather than by the first processor 21 when a retry enable signal is produced by the first processor 21. In addition, the error signal ER shown in FIG. 16 may be supplied to the second processor 20 alone. In this case, the diagnostic unit 30 is energized after a ready signal is supplied from the second processor 22 to the diagnostic unit 30.

What is claimed is:

1. An error recovery system for use in combination with an electronic digital computer system comprising a main memory for storing a plurality of programs and a plurality of processors for processing said programs, each program comprising a succession of instructions, each processor comprising executing means for fetching selected ones of said instructions and for executing each of the selected instructions, during a first period of time during which retry of execution of the selected instruction is allowable and a second period of time during which retry of execution of said selected instruction is not allowable, to produce masses of information, monitoring means for monitoring operation of said executing means to produce an error signal when an error is detected during execution of a particular one of the selected instructions and to suspend execution of the particular instruction, and retry enable signal producing means operatively coupled to said monitoring means for producing a retry enable signal during said first period of time during which retry of execution of each of said selected instructions is allowable, said executing means including register means responsive to said error signal for keeping, as status signals, a mass of information resulting from execution of the particular instruction, said error recovery system being energized on occurrence of the error in a first of said processors to make a second of said processors take over execution of the particular instruction, wherein the improvement comprises:

storage means coupled to the retry enable signal producing means and the register means of each processor and responsive to the retry enable signal produced in the first processor for taking over for storage therein the status signals kept in the first processor directly therefrom without being sent through said main memory;

the second processor comprising:

suspending means energized upon occurrence of the error in the first processor for suspending operation of the executing means of the second processor after completion of execution of one of the instructions fetched by the second processor that is currently executed; and ready signal producing means coupled to said suspending means for producing a ready signal after completion of execution of said one of the instructions;

said error recovery system further comprising:

delivering means responsive to the retry enable signal produced in the first processor and said ready signal for delivering the status signals directly from said storage means to the register means of the second processor without passing through said main memory, thereby, to enable the second processor to take over execution of said particular instruction.

2. An error recovery system as claimed in claim 1, further comprising accessing means responsive to the error signal produced in the first processor for accessing the retry enable signal producing means of the first processor to transfer the retry enable signal from the accessed retry enable signal producing means to said storage means.

3. An error recovery system as claimed in claim 2, comprising request means responsive to the retry enable signal transferred by said accessing means for supplying an interruption request to said suspending means to make said suspending means suspend execution of the executing means of the second processor.

4. An error recovery system as claimed in claim 1; the second processor further comprising:

means responsive to the error signal produced in the first processor for supplying an interruption request to said suspending means to enable said suspending means to suspend execution of the executing means of the second processor in response to said interruption request;

wherein said error recovery system comprises means responsive to said ready signal for accessing the retry enable signal produced in the first processor.

5. An error recovery system as claimed in claim 1, further comprising accessing means responsive to the error signal produced in the first processor for accessing the retry enable signal producing means of the first processor to transfer the retry enable signal from the accessed retry signal producing means to said storage means;

the second processor comprising means responsive to the error signal produced in the first processor for supplying an interruption request to said suspending means to enable said suspending means to suspend execution of the executing means of the second processor in response to said interruption request.

6. An error recovery system as claimed in any one of claims 1 through 5, said register means being operable in a normal and a shift mode in which said register means is operable as individual registers and a single shift register, respectively, wherein said error recovery system comprises mode control means responsive to the retry enable signal produced in the first processor for putting the register means of the first and the second processors into said normal and said shift modes, respectively.

* * * * *

UNITED STATES PATENT AND TRADEMARK OFFICE
CERTIFICATE OF CORRECTION

PATENT NO.   : 4,443,849
DATED        : April 17, 1984
INVENTOR(S)  : Hiroyuki Ohwada It is certified that error appears in the above-identified patent and that said Letters Patent is hereby corrected as shown below:

Column 5, lines 14-15, change "interpretting" to --interpreting--

Column 10, line 23, change "softward" to --software--

Column 11, line 51, change "interpretted" to --interpreted--

Column 12, line 10, change "38" to --33--

Column 13, line 15, change "controlled" to --controller--

Column 14, line 21, change "105" to --103--

Column 15, line 27, change "spring" to --string--

Signed and Sealed this

Twenty-sixth Day of March 1985

[SEAL]

Attest:

DONALD J. QUIGG

Attesting Officer

Acting Commissioner of Patents and Trademarks